United States Patent
Mori et al.

(10) Patent No.: US 12,145,502 B2
(45) Date of Patent: Nov. 19, 2024

(54) LIGHTING DEVICE

(71) Applicants: TOYODA GOSEI CO., LTD., Kiyosu (JP); TOYOTA JIDOSHA KABUSHIKI KAISHA, Toyota (JP)

(72) Inventors: Toshiaki Mori, Kiyosu (JP); Yoichi Matsuoka, Kiyosu (JP); Koichiro Endo, Nagoya (JP); Akinori Ushijima, Munakata (JP); Isamu Masakawa, Toyota (JP); Jota Kusakari, Toyota (JP)

(73) Assignees: TOYODA GOSEI CO., LTD., Aichi-pref. (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/461,774

(22) Filed: Sep. 6, 2023

(65) Prior Publication Data
US 2024/0109483 A1 Apr. 4, 2024

(30) Foreign Application Priority Data

Sep. 30, 2022 (JP) .................... 2022-157771

(51) Int. Cl.
  *B60Q 3/62* (2017.01)
  *B60G 3/10* (2006.01)
  *B60Q 3/10* (2017.01)
  *B60Q 3/70* (2017.01)
  *F21V 8/00* (2006.01)

(52) U.S. Cl.
  CPC ............ *B60Q 3/62* (2017.02); *B60G 3/10* (2013.01); *B60Q 3/70* (2017.02); *G02B 6/0006* (2013.01)

(58) Field of Classification Search
  CPC . G02B 6/006; B60Q 3/10; B60Q 3/70; B60Q 3/62
  See application file for complete search history.

(56) References Cited

U.S. PATENT DOCUMENTS 5,219,217 A * 6/1993 Aikens .................. B60Q 3/43
362/558

FOREIGN PATENT DOCUMENTS

| | | | | |
|---|---|---|---|---|
| CN | 114636122 A | * | 6/2022 | ............... B60Q 3/00 |
| EP | 4011704 A1 | * | 6/2022 | ............ B60Q 3/233 |
| JP | 2006103373 A | * | 4/2006 | |
| JP | 2015-182567 A | | 10/2015 | |

OTHER PUBLICATIONS

Innovation Q+ NPL Search (Year: 2024).*

* cited by examiner

*Primary Examiner* — Anabel Ton
(74) *Attorney, Agent, or Firm* — Posz Law Group, PLC

(57) ABSTRACT

A lighting device includes a first light source portion, a light guide that includes a light guide body with an elongated shape, guides light incident from the first light source portion in a longitudinal direction of the elongated shape, and emits a first light including the guided light to illuminate an illuminated object, and a second light source portion that emits a second light to illuminate the illuminated object. The second light source portion is provided independently of the first light source portion and the light guide.

8 Claims, 4 Drawing Sheets

(VIEW IN DIRECTION OF ARROW A)

(VIEW IN DIRECTION OF ARROW B)

(CROSS SECTION CUT ALONG LINE C-C)

LIGHTING DEVICE

CROSS-REFERENCE TO RELATED APPLICATIONS

The present patent application claims the priority of Japanese patent application No. 2022/157771 filed on Sep. 30, 2022, and the entire contents of Japanese patent application No. 2022/157771 are hereby incorporated by reference.

TECHNICAL FIELD

The present invention relates to a lighting device.

BACKGROUND ART

An elongated-shaped lighting device is known which is to be installed on, e.g., an instrument panel, etc., in the interior of a vehicle (see, e.g., Patent Literature 1). This lighting device is a vehicle interior lighting device which includes a lighting member having light-guiding properties and arranged on an instrument panel in the front part of a vehicle, and a substantially transparent clear cover body placed on the instrument panel at a portion in the vicinity of the lighting member. In the lighting device, the lighting member is housed in a groove extending in a vehicle width direction, and the groove housing the lighting member has an opening facing toward a lower surface. This opening is closed with the cover body as a substantially transparent clear member, and illumination light from the lighting member is emitted from the opening.

Also, another elongated-shaped lighting device is known which is to be installed on, e.g., an instrument panel, etc., in the interior of a vehicle (see, e.g., Patent Literature 2). This lighting device includes a light guide that emits light from a side surface by allowing light incident from one end to propagate therein and leaking the light from the side surface, and a flow-effect LED and a position-indication LED that are placed outside the light guide and shed light on the side surface of the light guide from outside the light guide such that light is emitted from the side surface due to light scattering by the light guide.

CITATION LIST

Patent Literatures

Patent Literature 1: JP 2006/103373 A
Patent Literature 2: JP 2015/182567 A

SUMMARY OF INVENTION

The light device of Patent Literature 1 may cause a problem that the range of light emitted by one light source is limited to the emission range of the lighting member having light-guiding properties so that it is difficult to illuminate a wider range so as to look continuous.

Also, the lighting device of Patent Literature 2 may cause a problem that although the light guide and two types of light sources (the first light source and the second light source) are used to perform the illumination, they are not configured such that light emitted from the two light sources looks continuous.

It is an object of the invention to provide a lighting device which can emit light such that illumination onto an illuminated object with light from separate light sources looks continuous.

(1) According to an aspect of the invention, a lighting device comprises:
  a first light source portion;
  a light guide that comprises a light guide body with an elongated shape, guides light incident from the first light source portion in a longitudinal direction of the elongated shape, and emits a first light comprising the guided light to illuminate an illuminated object; and
  a second light source portion that emits a second light to illuminate the illuminated object,
    wherein the second light source portion is provided independently of the first light source portion and the light guide.
(2) The second light source portion may be provided adjacent to the light guide or the first light source portion.
(3) The configuration may be such that the first light emitted from the first light source portion and the second light emitted from the second light portion partially overlap each other.
(4) The configuration may be such that each of the first light emitted from the first light source portion and the second light emitted from the second light portion is shone on the illuminated object through an outer lens having a light diffusion effect.
(5) The configuration may be such that the light guide is arranged in a front-rear direction of a vehicle, and wherein the first light and the second light are continuously shone on an interior panel of the vehicle.

Advantageous Effects of Invention

According to the lighting device of the invention, it is possible to emit light such that illumination onto the illuminated object with light from separate light sources looks continuous.

BRIEF DESCRIPTION OF DRAWINGS

FIG. 4B is a diagram showing an illumination state when the first and second light source portions are on.

FIG. 4C is a diagram showing the illumination state when only the first light source portion is on.

FIG. 4D is a diagram showing the illumination state when only the second light source portion is on.

DESCRIPTION OF EMBODIMENTS

Embodiment of the Invention

A lighting device 1 in the embodiment of the invention has a first light source portion 10, a light guide 20, and a second light source portion 15. The light guide 20 is a light guide body with an elongated shape, guides light incident from the first light source portion 10 in a longitudinal direction of the elongated shape, and emits a first light L1 as the guided light to illuminate an illuminated object. The second light source portion 15 emits a second light L2 to illuminate the illuminated object. The second light source portion 15 is provided independently of the first light source portion 10 and the light guide 20.

Since the lighting device 1 in the embodiment of the invention is a device which emits light from the first light source portion 10 and the second light source portion 15 to the outside, the object to be illuminated with light may be various objects or design surfaces with designs, etc.

Figure 1:
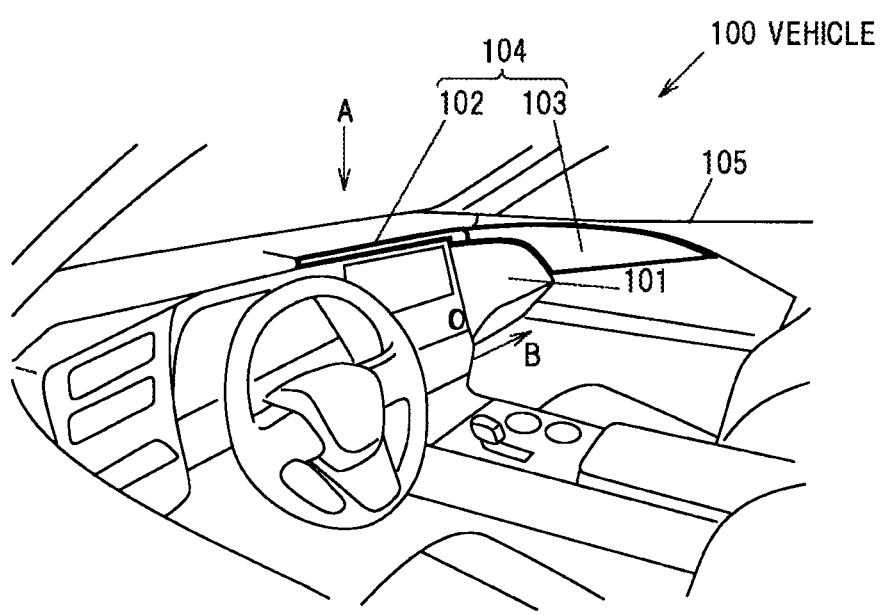
FIG. 1 is a three-dimensional perspective view showing the interior of a vehicle as an example where a lighting device in an embodiment of the present invention is installed.

FIG. 1 is a three-dimensional perspective view showing the interior of a vehicle as an example where a lighting device in the embodiment of the invention is installed. An instrument panel has a lower instrument panel 101 and an upper instrument panel 102. In the embodiment of the invention, as an example, the lighting device 1 is attached to a the side bezel 30 as shown in FIG. 2B which is mounted on a side surface of the lower instrument panel 101 of a vehicle 100. An example is described below where the lighting device 1 is installed in a vehicle cabin in which the upper instrument panel 102 is arranged above the lower instrument panel 101 and a door trim 103 on an inner side of a door 105, and the lighting device 1 illuminates vehicle interior panels 104 (the door trim 103 and part of the upper instrument panel 102) as the illuminated objects by continuously emitting light.

(The First Light Source Portion 10)

Figure 2A:
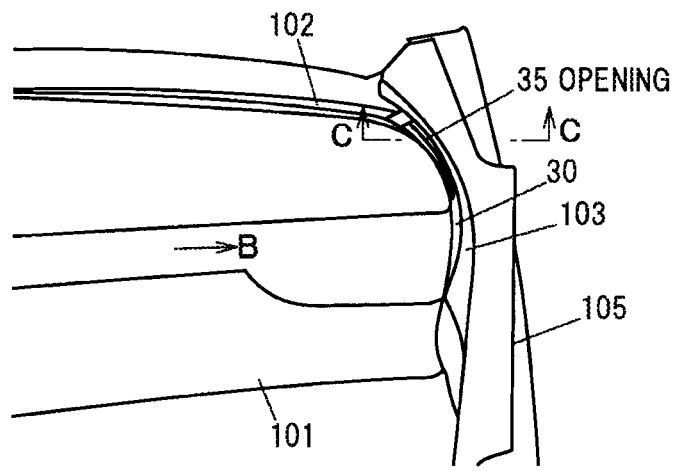
FIG. 2A is a top plan view when viewed in a direction A in FIG. 1 (when viewed from the upper side of the vehicle).
Figure 2B:
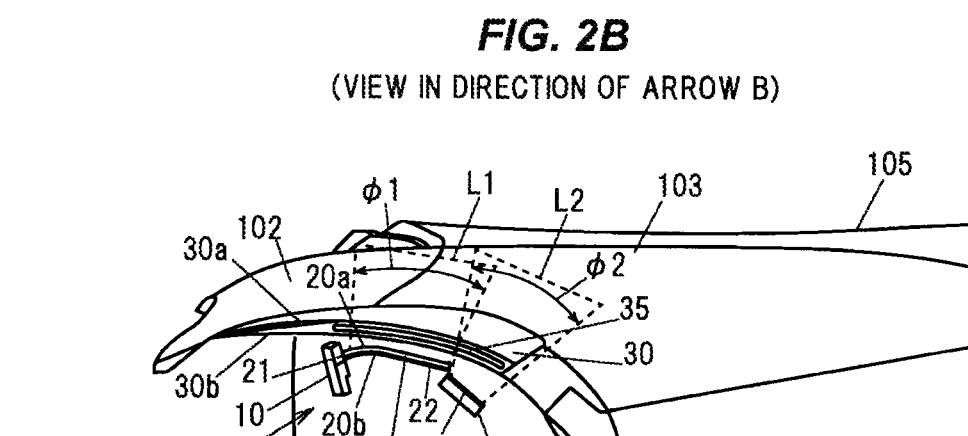
FIG. 2B is a side view when viewed in a direction B in FIG. 2A.
Figure 3:
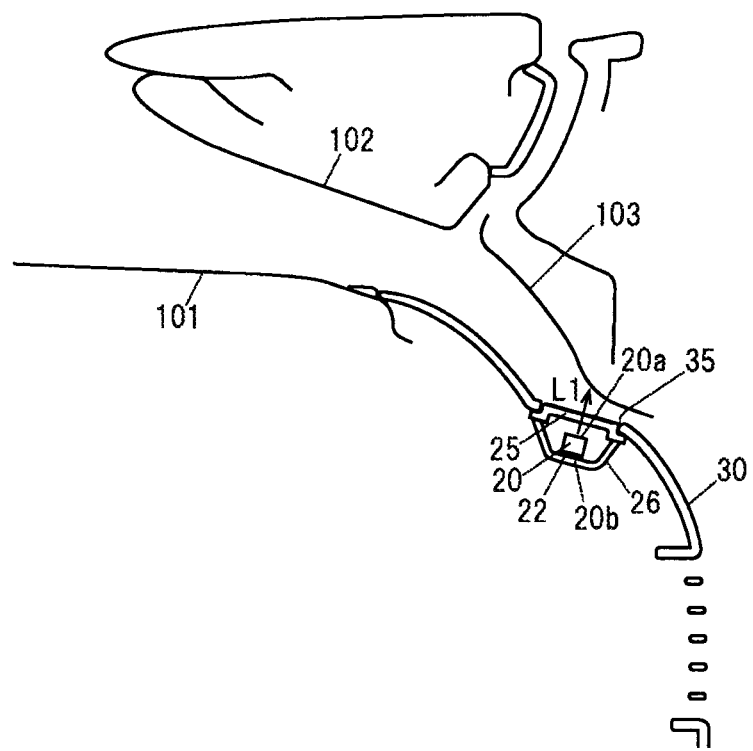
FIG. 3 is a cross-sectional view taken along line C-C in FIG. 2A.

FIG. 2A is a top plan view when viewed in a direction A in FIG. 1 (when viewed from the upper side of the vehicle), and FIG. 2B is a side view when viewed in a direction B in FIG. 2A. FIG. 3 is a cross-sectional view taken along line C-C in FIG. 2A. The first light source portion 10 is to generate light to be injected into the light guide 20 from one end 21 of the light guide 20. The first light source portion 10 used here is an LED (Light Emitting Diode) element as an example, but various light sources such as EL (Electro Luminescence) element or light bulb can be used. The first light source portion 10, which is an LED element, mainly emits visible light and can emit white light, light of each color of R, G, and B, or light of any color as a mixture thereof. Thus, illumination light guided by the light guide 20 from the first light source portion 10 and shone on illuminated objects, e.g., the upper instrument panel 102 and the door trim 103, can be set to various colors and arbitrary illuminance.

(The Light Guide 20)

As shown in FIG. 2B, the light guide 20 is a light guide body with an elongated shape formed of a translucent material to guide light from the first light source portion 10 and emit the light to the outside. The light guide 20 can be formed of, e.g., a resin with high transparency, such as PC (Polycarbonate) or PMMA (Polymethylmethacrylate).

The light guide 20 is formed in an elongated shape, and as shown in FIGS. 2B and 3, plural light scattering portions 22 to cause light guided in the longitudinal direction to be emitted in an emission direction substantially orthogonal to the longitudinal direction are formed on a back surface 20b of the light guide 20 along the longitudinal direction. The light scattering portions 22 are, e.g., substantially V-shaped recesses formed along the longitudinal direction on the back surface 20b side of the light guide 20. An angle of V of this V-shape can be arbitrarily set in consideration of the direction and intensity of light scattering. Thus, the light guided from the first light source portion 10 is emitted as the first light L1 from a front surface 20a of the light guide 20 to the door trim 103 and part of the upper instrument panel 102 which are illuminated objects, as shown in FIGS. 2B and 3.

(The Side Bezel 30)

As shown in FIGS. 2A, 2B and 3, the side bezel 30 is a frame to which the first light source portion 10, the light guide 20, and the second light source portion 15 are attached and which has an elongated-shaped opening 35 through which the first light L1 emitted from the light guide 20 passes and is emitted to the outside. The opening 35 is formed as a through-hole on the upper side of the side bezel 30 and is an opening for passage of light to illuminate the interior panels 104 (the door trim 103 and part of the upper instrument panel 102). The side bezel 30 can be formed of a synthetic resin such as ABS (Acrylonitrile Butadiene Styrene), as an example.

As shown in FIGS. 2A and 2B, the side bezel 30 is mounted from a right side of the lower instrument panel 101 toward a vehicle body side. The side bezel 30 is arranged at a position facing the upper instrument panel 102 and the door trim 103 such that light can be shone on these panels through the opening 35. As shown in FIGS. 2A, 2B and 3, an outer lens 25 having a light diffusion effect, the light guide 20, and a housing 26 are arranged in this order and attached to the side bezel 30 on a back surface 30b side. A unit body integrally including the side bezel 30 and these components is attached to the vehicle body (the lower instrument panel 101). In FIG. 2B and FIG. 3, portions unnecessary for explanation are omitted for ease of the explanation.

As shown in FIG. 2B, the first light L1 guided in the light guide 20 passes through the outer lens 25 and the opening 35, is emitted from a front surface 30a of the side bezel 30 to the outside within a predetermined emission angle, and illuminates a design surface of the door trim 103 and a design surface of part of the upper instrument panel 102.

The outer lens 25 is an optical element to evenly diffuse the light emitted from the light guide 20 to the outside, and is fitted in the opening 35 as shown in FIG. 3. The outer lens 25 is, e.g., a transparent resin article molded into an elongated shape similar to the light guide 20 and textured to diffuse (scatter) light. Alternatively, the outer lens 25 is, e.g., formed of a resin to which fine particles of silica, aluminum oxide or titanium oxide, etc. having high light diffusing (light scattering) properties are added as a light diffuser and which is molded into an elongated shape similar to the light guide 20.

(The Second Light Source Portion 15)

The second light source portion 15 is a light source provided independently of the first light source portion 10 and the light guide 20. As shown in FIG. 2B, the second light source portion 15 is provided adjacent to the light guide 20 or the first light source portion 10. Thus, the first light emitted from the first light source portion and the second light emitted from the second light source portion partially overlap each other, allowing illumination onto the illuminated object to look continuous. The second light source portion 15 of the lighting device 1 in the embodiment preferably uses the same light emission method as the first light source portion 10 and is, e.g., an LED since the aim of the invention is to provide a lighting device which can emit light such that illumination onto the illuminated object with light from the first light source portion 10 and the second light source portion 15, which are separate light sources, looks continuous.

The second light source portion 15 used here is an LED (Light Emitting Diode) element as an example, but various light sources such as EL (Electro Luminescence) element or light bulb can be used, in the same manner as the first light source portion 10. The second light source portion 15, which is an LED element, mainly emits visible light and can emit white light, light of each color of R, G, and B, or light of any color as a mixture thereof. Thus, illumination light emitted from the second light source portion 15 to the door trim 103 can be set to various colors and arbitrary illuminance.

As shown in FIG. 2B, an outer lens 16 having a light diffusion effect and the second light source portion 15 are arranged in this order and attached to the side bezel 30 on the back surface 30*b* side. In FIG. 2B, portions unnecessary for explanation are omitted for ease of the explanation.

The outer lens 16 is an optical element to evenly diffuse light emitted from the second light source portion 15 to the outside. The outer lens 16 is, e.g., an optical lens diffusing light at a predetermined emission angle φ2, which is textured to diffuse (scatter) light. Alternatively, the outer lens 16 is an optical lens with the function described above, which is formed using, e.g., a resin to which fine particles of silica, aluminum oxide or titanium oxide, etc. having high light diffusing (light scattering) properties are added as a light diffuser.

As shown in FIG. 2B, the first light source portion 10, the light guide 20 and the second light source portion 15 are located in close proximity. The first light L1 diffused at an emission angle φ1 from the first light source portion 10 and the light guide 20 and the second light L2 diffused at the emission angle φ2 from the second light source portion 15 are positioned so as to partially overlap. As a result, the first light L1 emitted from the first light source portion 10 and the second light L2 emitted from the second light source portion 15 look continuous on the illuminated object.

Figure 4A:
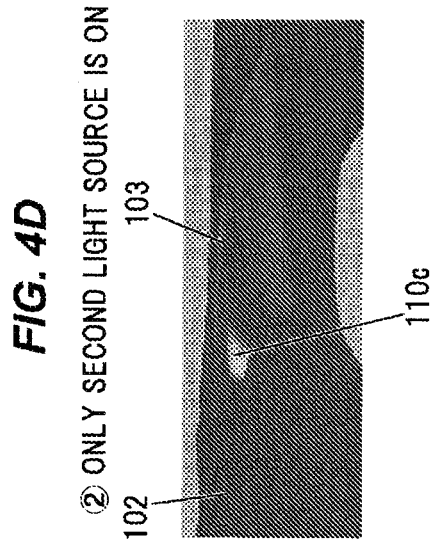
FIG. 4A is a graph showing a range and illuminance of illumination of an upper instrument panel and a door trim, which are illuminated objects, by a first light source portion and a second light source portion, with the horizontal axis indicating a position in a front-rear direction of the vehicle and the vertical axis indicating brightness of illumination.
Figure 4C:
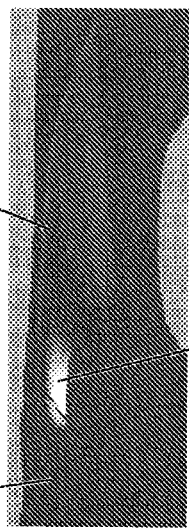
Figure 4D:
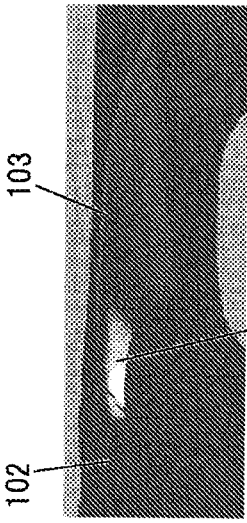
Figure 4B:
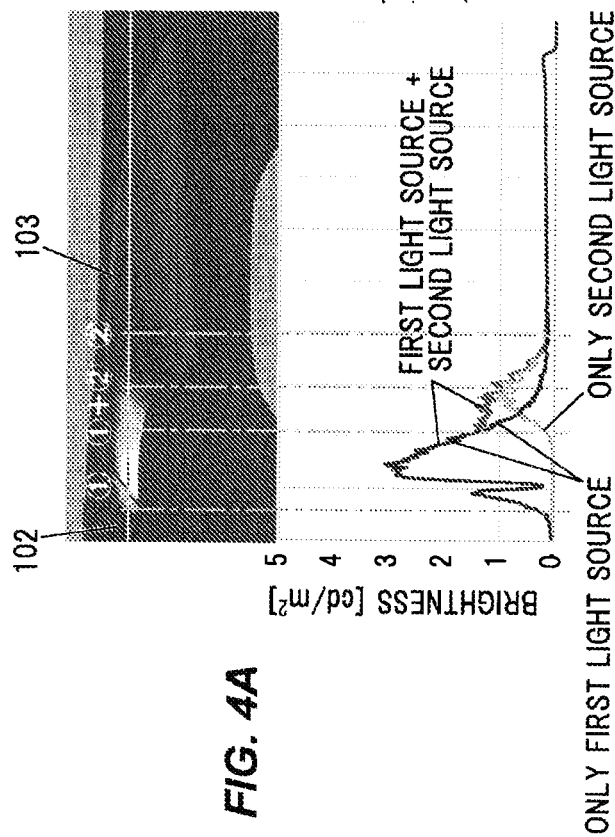

FIG. 4A is a graph showing a range and illuminance of illumination of the upper instrument panel and the door trim, which are illuminated objects, by the first light source portion and the second light source portion, with the horizontal axis indicating a position in the front-rear direction of the vehicle and the vertical axis indicating brightness of illumination, FIG. 4B is a diagram showing an illumination state when the first and second light source portions are on, FIG. 4C is a diagram showing the illumination state when only the first light source portion is on, and FIG. 4D is a diagram showing the illumination state when only the second light source portion is on.

As shown in FIG. 4A, the brightness distribution of the first light L1 emitted from the first light source portion is shown as denoted by "only the first light source" in the drawing, and the brightness value gradually decreases in a right tail region of the brightness distribution. Meanwhile, the brightness distribution of the second light L2 emitted from the second light source portion is shown as denoted by "only the second light source" in the drawing, and is substantially Gaussian distribution (normal distribution) in the right tail region of the brightness distribution of only the first light source.

The brightness distribution of the light emitted from the first light source+the second light source is the brightness distribution of the superimposed first and second lights L1 and L2 and is shown as denoted by "the first light source+the second light source". In the right tail region of the brightness distribution of the first light L1 emitted from the first light source, the first light L1 from the first light source and the second light L2 from the second light source overlap and the brightness distribution of the first light source+second light source thus has a more gradual slope than when only the first light source.

FIG. 4B is a diagram showing an illumination state when the first and second light source portions are on, and a bright region 110*a* is a region where the upper instrument panel 102 and the door trim 103 are illuminated. FIG. 4C is a diagram showing the illumination state when only the first light source portion is on, and a bright region 110*b* is a region where the upper instrument panel 102 and the door trim 103 are illuminated. FIG. 4D is a diagram showing the illumination state when only the second light source portion is on, and a bright region 110*c* is a region where the upper instrument panel 102 and the door trim 103 are illuminated.

When comparing FIGS. 4B, 4C, and 4D, illumination of the interior panels 104 (the door trim 103 and part of the upper instrument panel 102) looks more continuous when the first light source and the second light source are on at the same time. Since the upper instrument panel 102 is mounted on the body side of the vehicle 100 and the door trim 103 on the door side of the vehicle 100, the door trim 103 and the upper instrument panel 102 cannot be integrally formed. Therefore, it is necessary to illuminate the upper instrument panel 102 and the door trim 103 respectively by separate light sources (the first light source and the second light source), and in such a case, the lighting device 1 in the present embodiment has a remarkable effect.

Effects of the Embodiment of the Invention (1) The lighting device 1 in the embodiment of the invention has the first light source portion 10, the light guide 20 which is a light guide body with an elongated shape, guides light incident from the first light source portion 10 in the longitudinal direction of the elongated shape, and emits the guided first light L1 to illuminate the illuminated object, and the second light source portion 15 that emits the second light L2 to illuminate the illuminated object, and the second light source portion 15 is provided independently of the first light source portion 10 and the light guide 20. Since the lighting device 1 has the first light source portion 10 and the second light source portion 15 provided independently, it is possible to make illumination onto the illuminated object look continuous.

(2) In the configuration above, by providing the second light source portion 15 adjacent to the light guide 20 or the first light source portion 10, the first light emitted from the first light source portion and the light emitted from the second light source portion partially overlap, allowing illumination onto the illuminated object to look more continuous.

(3) The first light L1 emitted from the first light source portion 10 and the second light L2 emitted from the second light source portion 15 are shone on the illuminated objects respectively through the outer lenses 25 and 16 having a light diffusion effect. The outer lenses 25 and 16 used as optical elements to evenly diffuse light to the outside are lenses which are textured or to which fine particles of silica, aluminum oxide or titanium oxide, etc. having high light diffusing (light scattering) properties are added as a light diffuser. This further improves the continuity of illumination described in the above (1) and (2).

Although the embodiment of the invention has been described, the invention is not intended to be limited to the embodiment, and the various kinds of modifications can be implemented without departing from the gist of the invention. In addition, the embodiment described above does not limit the invention according to the claims. Further, please note that not all combinations of the features described in the embodiment are necessary to solve the problem of the invention.

REFERENCE SIGNS LIST

1 LIGHTING DEVICE
10 FIRST LIGHT SOURCE PORTION
15 SECOND LIGHT SOURCE PORTION
20 LIGHT GUIDE
20a FRONT SURFACE
20b BACK SURFACE
21 ONE END
22 LIGHT SCATTERING PORTION
25 OUTER LENS
26 HOUSING
30 SIDE BEZEL
30a FRONT SURFACE
30b BACK SURFACE
35 OPENING
100 VEHICLE
101 LOWER INSTRUMENT PANEL
102 UPPER INSTRUMENT PANEL
103 DOOR TRIM
104 INTERIOR PANEL
105 DOOR
110a, 110b, 110c BRIGHT REGION
L1 FIRST LIGHT
L2 SECOND LIGHT
$\varphi 1$, $\varphi 2$ EMISSION ANGLE

The invention claimed is:

1. A lighting device, comprising:
a first light source portion;
a light guide that comprises a light guide body with an elongated shape, guides light incident from the first light source portion in a longitudinal direction of the elongated shape, and emits a first light comprising the guided light to illuminate an illuminated object; and
a second light source portion that emits a second light to illuminate the illuminated object,
wherein the second light source portion is provided independently of the first light source portion and the light guide,
wherein the first light emitted from the first light source portion and the second light emitted from the second light portion partially overlap each other.

2. The lighting device according to claim 1, wherein the second light source portion is provided adjacent to the light guide or the first light source portion.

3. The lighting device according to claim 1, wherein each of the first light emitted from the first light source portion and the second light emitted from the second light portion is shone on the illuminated object through an outer lens having a light diffusion effect.

4. The lighting device according to claim 1, wherein the light guide is arranged in a front-rear direction of a vehicle, and wherein the first light and the second light are continuously shone on an interior panel of the vehicle.

5. The lighting device according to claim 2, wherein each of the first light emitted from the first light source portion and the second light emitted from the second light portion is shone on the illuminated object through an outer lens having a light diffusion effect.

6. The lighting device according to claim 2, wherein the light guide is arranged in a front-rear direction of a vehicle, and wherein the first light and the second light are continuously shone on an interior panel of the vehicle.

7. The lighting device according to claim 4, wherein each of the first light emitted from the first light source portion and the second light emitted from the second light portion is shone on the illuminated object through an outer lens having a light diffusion effect.

8. The lighting device according to claim 5, wherein the light guide is arranged in a front-rear direction of a vehicle, and wherein the first light and the second light are continuously shone on an interior panel of the vehicle.

* * * * *